United States Patent Office 2,829,038
Patented Apr. 1, 1958

2,829,038

METHOD OF CONTROLLING PLANT GROWTH

Paul Ochsner, Uccle-Brussels, Belgium, assignor to Union Chimique Belge, S. A., Brussels, Belgium, a corporation of Belgium No Drawing. Application May 9, 1955
Serial No. 507,182

Claims priority, application Belgium May 14, 1954

6 Claims. (Cl. 71—2.6)

The present invention relates to the preparation of weed-killers. These products contain aromatic sulfamides corresponding to the general formula

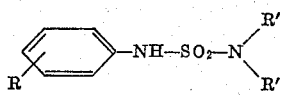

in which R is hydrogen or halogen atom or a lower aliphatic radical; R' is a lower aliphatic radical.

The aromatic sulfamides are obtained by reacting a sulfamyl halide with an aniline substituted or not. The products so prepared act as selective weed-killers, that is to say that they destroy some plants at a determined stage of their growth while they do not attack other plants.

To determine the specific properties of weed-killers, three methods are used. In all cases, the first thing to do is to prepare a solution of the product in a solvent having itself no herbicidal action upon the tested plant.

*Method A.*—A diluted solution of the examined product is sprayed on a plant.

*Method B.*—A drop of a solution of the examined product is put on determined places of a plant.

*Method C.*—Definite quantities of a solution of the examined product are injected in the stalk of the plant with a micrometric syringe.

The two last methods give the possibility to distinguish between contact weed-killers which only cause necrosis at the treated places and teletoxics products which destroy all the plant.

For use, the products of the invention may be mixed with diluting, wetting, emulsifying and other agents. The object of the following examples is to show the selective action of aromatic sulfamides used as weed-killers. To this end, one of the three aforesaid methods is applied to various mono- or di-cotyledons such as: oats, beet, chicory, wheat, beans, flax, lucern, corn-salad, turnip, daisy, radish and tomatoes.

*Example 1.—Preparation of N,N-dimethyl-N'-(4-methylphenyl) sulfamide*

A mixture of 53 gr. (0.5 mole) of p-methylaniline and 36 gr. (0.25 mole) dimethylsulfamyl chloride dissolved in 250 ml. of anhydrous benzene is heated for three hours at 50° C.; after cooling, the N,N-dimethyl-N'-(4-methylphenyl) sulfamide is extracted by means of a diluted solution of sodium hydroxide. The solution is washed with ether and the sulfamide is precipitated by adding hydrochloric acid. The so formed crystals are separated and dried. 50 gr. of N,N-dimethyl-N'-(4-methylphenyl) sulfamide (melting point 80° C.) are so obtained. The yield of the preparation is 94% taking into account the recovery of 23.3 gr. of p-methylaniline.

*Example 2.—Preparation of N,N-dimethyl-N'-(3-chlorophenyl) sulfamide*

A mixture of 225 gr. (2 moles) of m-chloraniline and 159 gr. (1.1 mole) of dimethylsulfamyl chloride dissolved in 600 ml. of anhydrous benzene is heated under reflux for 5 hours. After cooling, the m-chloraniline hydrochloride is extracted by means of a diluted solution of hydrochloric acid. The residue obtained after distillation of the benzene is dissolved in a diluted solution of sodium hydroxide.

Activated charcoal is added after filtration; the filtrate is acidified with hydrochloric acid. The crystals formed are filtered under vacuum and dried. 121 gr. N,N-dimethyl-N'-(3-chlorophenyl) sulfamide (melting point 88° C.) are so obtained. The yield is 51%.

In the same way, following compounds are prepared:

| | M. P., ° C. |
|---|---|
| N,N-dimethyl-N'-phenylsulfamide | 61–63 |
| N,N-diethyl-N'-phenylsulfamide | 32 |
| N,N-dimethyl-N'-(4-chlorophenyl)sulfamide | 53 |

*Example 3.—Preparation of N,N-diethyl-N'-(3-chlorophenyl) sulfamide and N,N-diethyl-N'-(4-chlorophenyl) sulfamide*

N,N-diethyl-N'-(3-chlorophenyl)sulfamide—boiling point 140–150° C./0.02 mm. Hg.

N,N-diethyl-N'-(4-chlorophenyl)sulfamide, M. P. 50° C.

are new products. They are obtained as described in Examples 1 and 2.

*Example 4.—Action of N,N-dimethyl-N'-(4-chlorophenyl)sulfamide on germination (Method A)*

Seeds of oats, beet, chicory, wheat, flax, lucern, corn-salad, daisy and radish were sowed in mould contained in boxes of 600 cm.² surface. The boxes were sprayed with 20 ml. of a solution of 0.5 gr. N,N-dimethyl-N'-(4-chlorophenyl)sulfamide in 100 ml. of ethyl alcohol of 95% concentration (which corresponds to 16.7 kg. per hectare). Preliminary tests demonstrated that ethyl alcohol of 95% concentration had no toxic effect on the plants under examination.

During the first two weeks after the treatment a reduction of the percentage of the germination, with regard to untreated plants has been observed for the chicory, the flax, the radish. After four weeks, the young sprouts looked as follows:

Oats: reduced size
Beet: partial attack
Chicory: partial destruction
Wheat: no action, size somewhat higher than that of the untreated plants
Flax: partial attack
Lucern: partial destruction
Corn-salad: partial destruction
Daisy: no action
Radish: partial destruction With a double concentration in sulfamide, a complete destruction has been observed after four weeks for the young sprouts of chicory, flax, lucern, daisy and radish.

In conclusion, the N,N-dimethyl-N'-(4-chlorophenyl) sulfamide has no action on wheat and a little one on oats. The effect of the concentration is also to be observed for daisy, while this effect is not observed for beet.

*Example 5.—Action of N,N-dimethyl-N'-(4-chlorophenyl)sulfamide on young sprouts (Method A)*

The same seeds as in Example 4 were sowed. One week after germination, the young sprouts were treated with a solution of 0.5% (by volume) of N,N-dimethyl-N'-(4-chlorophenyl)sulfamide. Ten days after the treatment, the following results have been observed.

Oats: nearly complete destruction
Beet: nearly complete destruction and burns
Chicory: complete destruction
Wheat: size smaller than the blanks
Flax: complete destruction
Lucern: complete destruction
Corn-salad: no action
Daisy: no action
Radish: partial destruction With a concentration of 1% of the active product, the same effects but increased, have been observed.

In conclusion, the herbicidal action of the examined product is faster and sharper on young sprouts than on the seeds at the germination time.

*Example 6.—Action of N,N-dimethyl-N'-(3-chlorophenyl)sulfamide on germination (Method A)*

The operation is the same as in Example 4, but a solution of 0.5% (by volume) of N,N-dimethyl-N'-(3-chlorophenyl)sulfamide is used. After four weeks, the following results are observed:

Oats: slight yellowing
Beet: no action
Chicory: a few plants are faded
Wheat: size smaller than the blanks
Flax: a few plants are destroyed
Lucern: no action
Corn-salad: partial destruction
Daisy: no action
Radish: partial destruction.

With a concentration of 1% (by volume) of the active product, the complete destruction of the young sprouts of chicory and radish is observed.

In conclusion, there is a marked action of the product on wheat; on the contrary no destruction is observed on beet and lucern although in Example 4 partial attacks are noted.

*Example 7.—Action of various weed-killers on the turnip (Method B)*

Following products in solution at 0.5% and 1% by volume are examined:
Compound 1: N,N-dimethyl-N'-phenylsulfamide
Compound 2: N,N - dimethyl - N'-(4-methylphenyl)sulfamide
Compound 3: N,N - dimethyl - N'-(3-chlorophenyl)sulfamide
Compound 4: N,N - dimethyl - N'-(4-chlorophenyl)sulfamide
Compound 5: N,N-diethyl-N'-phenylsulfamide
Compound 6: N,N-diethyl-N'-(3-chlorophenyl)sulfamide
Compound 7: N,N-diethyl-N'-(4-chlorophenyl)sulfamide
C. M. U.: N-(p-chlorophenyl)-N',N'-dmethylurea
U. R. A. B.: N-phenyl-N',N'-dimethylurea.

About 40 drops of 0.005 ml. of a solution at 0.5% or 1% of aforesaid products in alcohol are put on two leaves of a turnip plant.

Compound 1 causes only necrosises which disappear after a few days.

Compound 2 causes necrosises which do not disappear, the leaves are destroyed after 4 weeks.

Compound 3 in solution at 1% kills the plants within 7 days.

Compound 4 in solution at 0.5% causes necrosises which extend to the complete surface of the leaves, but there is no mortality within 25 days; in solution at 1% it kills the plant within 5 to 7 days.

Compound 5 has a weak activity of which the effects are practically the same as those of compound 2 (destruction after 4 weeks).

Compounds 6 and 7 act practically as the compounds 3 and 4, in other words they kill the plant in 5 to 7 days when in solution at 1%.

To obtain the same results 10 days are necessary with the U. R. A. B. and 12 days with C. M. U.

*Example 8.—Action of various weed-killers on tomatoes (Method B)*

Over the compounds 3 and 4 and 6 of Example 7, following products were examined:

C. M. U: N-(p-chlorophenyl)-N',N'-dimethylurea
2,4 D: sodium 2,4-dichlorophenoxyacetate
D. N. O. C.: ammonium 4,6-dinitro-orthocresolate
NaOCl$_3$: sodium chlorate As in the foregoing example, 0.2 cm.$^3$ in drops of a solution at 0.5 or 1% are put on two leaves of the plant.

The most active products are the compounds 3 and 6, i. e. the N,N-dimethyl- and N,N-diethyl-N'-(3-chlorophenyl)sulfamides, which in solution at 0.5% cause deep burns on all the leaves and in solution at 1% kill the plants within 7 days. Compound 4 is slightly less active. The sodium chlorate causes a slow decaying of the plant by dessication of the treated places. The action of the 2,4 D and the C. M. U. is slower than those of the aromatic sulfamides at a concentration of 1%; on the contrary an opposite effect is observed at a concentration of 0.5%. As to the D. N. O. C., it acts practically as the NaOCl$_3$ in other words as contact weed-killer.

*Example 9.—Action of the weed-killers on the beans (Method B)*

Plants treated according to Method B are destroyed within 14 days by the C. M. U. and within 18 days by the U. R. A. B. They are not destroyed by the aromatic sulfamides (compounds 1 to 7 of Example 8) at a concentration equal to 1%.

*Example 10.—Action of the weed-killers on tomatoes (Method C)*

An injection of 0.15 mg. of N,N-dimethyl-N'-(4-chlorophenyl)sulfamide in the stalk of a tomato plant causes its destruction within 6 days.

To obtain a same result, 20 days are necessary with an equal quantity of 2,4 D (sodium 2,4-dichlorophenoxyacetate). In the same conditions, the D. N. O. C. (ammonium 4,6-dinitroorthocresolate) causes deep necrosises at the place of the injection, but not the mortality of the plant.

The foregoing examples clearly demonstrate that the aromatic sulfamides act as selective weed-killers.

I claim:

1. A method for the control of plant growth which comprises applying to the plant foliage an herbicidal amount of an aromatic sulfamide corresponding to the formula

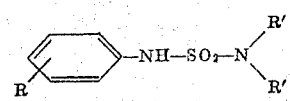

wherein R is a member selected from the group consisting of hydrogen and halogen atoms and methyl groups, and R' represents an alkyl group with 1 to 2 carbon atoms.

2. A method for the control of plant growth which comprises applying to the plant foliage an herbicidal amount of N,N-dimethyl-N'-(4-methylphenyl)sulfamide.

3. A method for the control of plant growth which comprises applying to the plant foliage an herbicidal amount of N,N-dimethyl-N'-(3-chlorophenyl)sulfamide.

4. A method for the control of plant growth which comprises applying to the plant foliage an herbicidal amount of N,N-dimethyl-N'-(4-chlorophenyl)sulfamide.

5. A method for the control of plant growth which comprises applying to the plant foliage an herbicidal amount of N,N-diethyl-N'-(3-chlorophenyl)sulfamide.

6. A method for the control of plant growth which comprises applying to the plant foliage an herbicidal amount of N,N-diethyl-N'-(4-chlorophenyl)sulfamide.

References Cited in the file of this patent

UNITED STATES PATENTS 2,079,541     Battegay _____ May 4, 1937

OTHER REFERENCES

Wheeler et al: "Journal of American Chemical Society," vol. 66, pages 1242–3 (1944).